United States Patent [19]
Rice et al.

[11] Patent Number: 6,001,252
[45] Date of Patent: Dec. 14, 1999

[54] IN SITU ANAEROBIC DEHALOGENATION

[75] Inventors: John M Rice, Fitchburg; Stacey A Koch, Madison, both of Wis.

[73] Assignee: RMT, Inc., Madison, Wis.

[21] Appl. No.: 09/112,557

[22] Filed: Jul. 9, 1998

[51] Int. Cl.$^6$ .................................................... C02F 3/00
[52] U.S. Cl. ..................... 210/610; 210/747; 210/708; 435/262.5
[58] Field of Search .................................. 210/605, 606, 210/610, 611, 747, 757, 908; 166/246; 435/262, 262.5, 250, 244

[56] References Cited

U.S. PATENT DOCUMENTS

| | | |
|---|---|---|
| 4,401,569 | 8/1983 | Jaheveri et al. . |
| 5,200,343 | 4/1993 | Cole et al. . |
| 5,342,769 | 8/1994 | Hunter et al. . |
| 5,587,317 | 12/1996 | Odom . |
| 5,753,122 | 5/1998 | Taylor et al. . |
| 5,830,746 | 11/1998 | Copeland et al. . |
| 5,833,855 | 11/1998 | Saunders . |
| 5,840,191 | 11/1998 | Eccles . |
| 5,910,245 | 6/1999 | Bernhardt et al. . |

OTHER PUBLICATIONS

Gibson, et al. "Extrapolation of Biodegradation Results to Groundwater Aquifers: Reductive Dehalogenation of Aromatic Compounds" *Applied and Environmental Microbiology* 52:4, 681–688 (1986).

Chu, et al. "Treatment of Tetrachloroethylene With Anaerobic Attached Film Process", *Journal of Environmental Engineering* 120:1, 58–71 (1994).

Bagley et al. "Tetrachloroethene Transformation to Trichloroethene and cis–1,2–Dichloroethene by Sulfate–Reducing Enrichment Cultures", *Applied and Environmental Microbiology* 56:8, 2511–2516 (1990).

Chen, et al. "Transformations of 1,1,2,2–Tetrachloroethane under Methanogenic Conditions", *Environmental Science & Technology* 30 :2, 542–547 (1996).

Universitty of Groningen Centre for Ecological and Evolutionary Studies (CEES) Annual Report (1996), excerpt p. 23–28 of 46, re: Microbial Ecology.

van de Pas, B. "Bioenergetics of anaerobic bacteria that use chlorinated compounds as terminal electron acceptor growth", Wageningen Agricultural University, Department of Biomolecular Services (1997) (Web page).

Ellis, L. "Tetrachloroethene Pathway Map (Anaerobic)", University of Minnesota (1998) (Web page).

U.S. Dept. of Defense, Brooks Air Force Base, Environmental, Safety and Occupational Health, Technical Planning Integrated Product Team, "Need No. 2008" (1997) (Web page).

*Primary Examiner*—David A. Simmons
*Assistant Examiner*—Fred Prince
*Attorney, Agent, or Firm*—Quarles & Brady LLP

[57] ABSTRACT

A method for in situ anaerobic dehalogenation of a halogenated organic compound in a groundwater plume reduces or prevents indigenous aerobic microorganisms from competing for a supplied electron donor with an anaerobic microorganism that reductively dehalogenates the organic compound when an electron donor is available. The method includes the step of injecting in situ into a groundwater-saturated matrix within or upgradient of a source of the organic compound a deoxygenated aqueous solution that comprises an electron donor to facilitate reductive dehalogenation of the organic compound.

10 Claims, 2 Drawing Sheets

IN SITU ANAEROBIC DEHALOGENATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Halogenated organic compounds, particularly aliphatic organics such as the chloroethanes and chloroethenes, especially tetrachloroethene (also known as perchloroethene or PCE), trichloroethene (TCE), dichloroethene (DCE) and vinyl chloride (VC), are common groundwater contaminants in the United States and elsewhere. PCE is a solvent used to clean machinery, electronic parts, and clothing. Many halogenated organics and their degradation products are suspected carcinogens. The degradation products can often be degraded by indigenous aerobic microorganisms, but, PCE and other recalcitrant halogenated organics, are degraded anaerobically. Enhancing or modifying subsurface conditions can provide anaerobic conditions that promote reductive dehalogenation. PCE impacted groundwater, for example, has historically been treated using conventional pump and treat or air sparging methods. These approaches require large capital, operation, and maintenance investments and still take a long time to remediate the groundwater. Therefore, efforts are underway to develop biological methods for remediating the more recalcitrant halogenated organic compounds typified by PCE.

PCE and other recalcitrant compounds can be degraded by anaerobic microorganisms under reducing conditions. In the laboratory, anaerobic PCE degradation can be enhanced by adding trace nutrients, and an electron donor substrate such as lactate, under reducing conditions. Although the chemistry has been conceptually demonstrated in the laboratory, the laboratory results are not necessarily applicable to in situ remediation because of numerous differences from the controlled laboratory environment. In particular, aerobic bacteria, not present in the laboratory models, can utilize the electron donor as an energy source and can grow to high numbers when the substrate is added. Moreover, the aerobic bacteria, which have little if any capacity to degrade the recalcitrant halogenated organic compounds, deplete the added substrate and require that additional substrate be added to accomplish the original purpose of degrading the halogenated organic compounds.

In prior field methods, an anaerobic environment is created over a long time frame, by allowing aerobic bacteria to use the added excess electron donor, typically lactate, as an energy source, thereby depleting oxygen from the groundwater and the saturated matrix, which can include soil or rock. Once the level of dissolved oxygen in the groundwater reaches approximately 1 mg/L, indigenous anaerobic bacteria can begin to degrade the PCE.

However, the prior field method is disfavored because once the dissolved oxygen reaches a suitably low level, and before any PCE is degraded, a substantial amount of the added lactate has been utilized by the aerobic bacteria, thereby requiring input of additional electron donor. Existing biological methods are further hampered by the fact that the aerobic growth that reduces the dissolved oxygen concentration has the undesirable side effect of clogging the subsurface, soil matrix or injection well. Accordingly, it would be desirable to devise a method that facilitates in situ anaerobic dehalogenation while avoiding an aerobic growth stage.

BRIEF SUMMARY OF THE INVENTION

The present invention is summarized in that a method for in situ anaerobic dehalogenation of a halogenated organic compound in a groundwater plume prevents or limits indigenous aerobic microorganisms from competing for a supplied electron donor with an anaerobic microorganism that reductively dehalogenates the organic compound when an electron donor is available. Because the aerobic microorganisms cannot effectively compete for the electron donor, the anaerobic microorganism reductively dehalogenates the organic compound substantially without competition for the electron donor. Notably, the method overcomes the rate limiting step by degrading the recalcitrant halogenated compounds to produce products that can themselves be more readily degraded, either anaerobically by reductive dehalogenation, or aerobically.

The method includes the step of injecting in situ, into a groundwater-saturated matrix upgradient of, or within an area that has been impacted by, a halogenated organic compound, a deoxygenated aqueous solution that comprises an electron donor. The deoxygenated solution is injected in an amount sufficient to establish an anaerobic treatment zone that comprises the anaerobic microorganism. The amount of dissolved oxygen in the deoxygenated solution is sufficiently low that the solution cannot support growth of aerobic microorganisms in the treatment zone, typically about 1 mg/L or less. The electron donor is injected in an amount sufficient to support reductive dehalogenation of the organic compound in the treatment zone by the anaerobic microorganism.

It is an object of the present invention to facilitate reductive dehalogenation in situ while reducing or preventing aerobic growth by indigenous microorganisms.

It is another object of the present invention to supply the substantially less electron donor than prior methods, wherein the electron donor was added in prior methods to facilitate depletion of available oxygen by indigenous aerobic bacteria. In the prior methods, the aerobic bacteria used the electron donor as an energy source. By reducing the amount of electron donor material required in the present method, the cost of the method is substantially reduced relative to other methods that add electron donor to facilitate oxygen depletion.

It is an advantage of the present invention that the method can be practiced at lower material cost than other similar methods because there is reduced need for electron donor and because the electron donor is used at low concentration.

It is a feature of the present invention that the electron donor is administered in a large volume of deoxygenated water. The large volume establishes a large treatment zone from the point of injection.

It is another feature of the present invention that the aqueous solution is deoxygenated, thereby reducing or preventing the undesirable and energetically disfavored growth of indigenous aerobic microorganisms at the site.

Other objects, features, and advantages of the present invention will become apparent upon consideration of the following detailed description, taken in conjunction with the accompanying drawings.

DETAILED DESCRIPTION OF THE INVENTION

Figure 1:
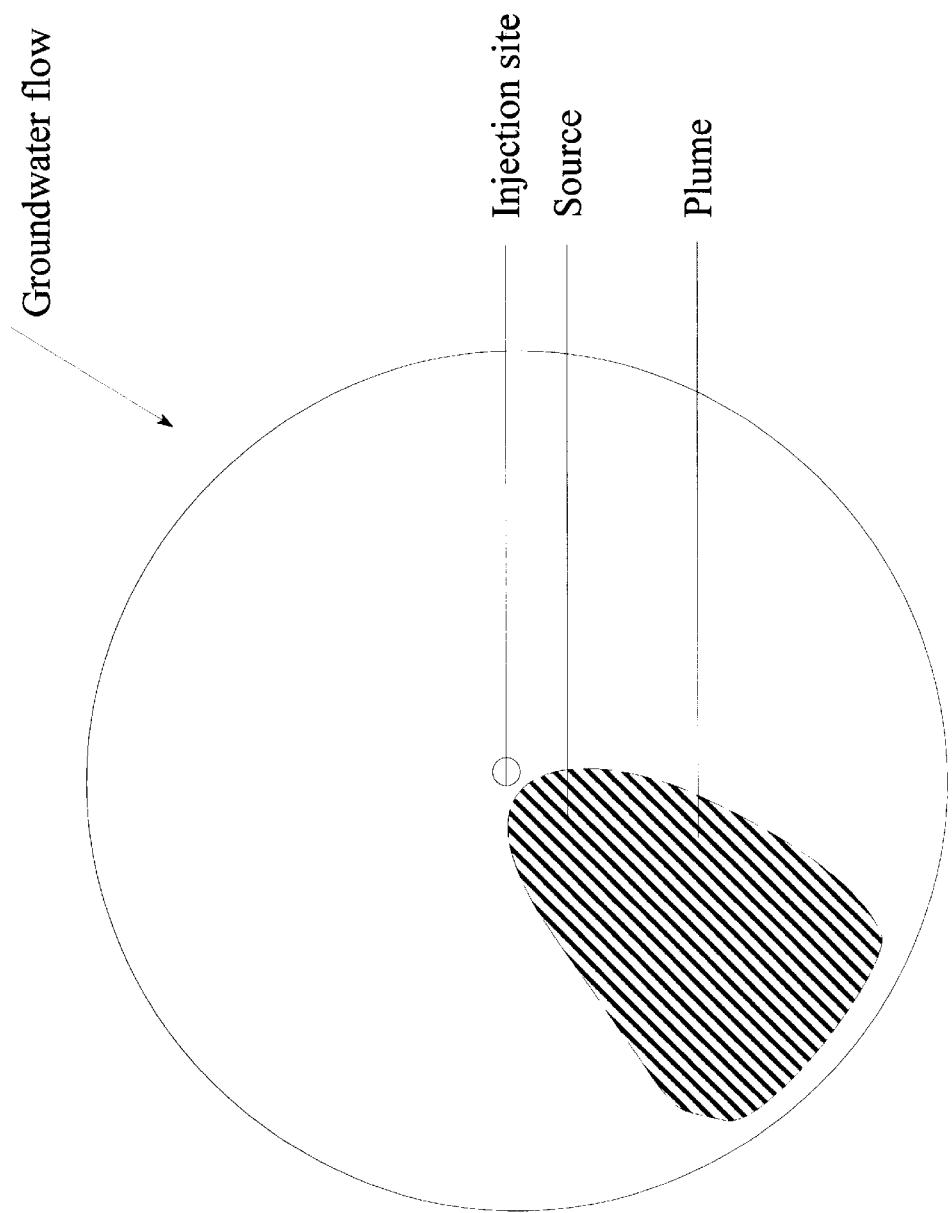
FIG. 1 depicts a schematic plan view of a site that contains a plume that includes a halogenated organic compound emanating from a source. Also shown are an injection well upgradient of the plume and a treatment zone established after injection.
Figure 2:
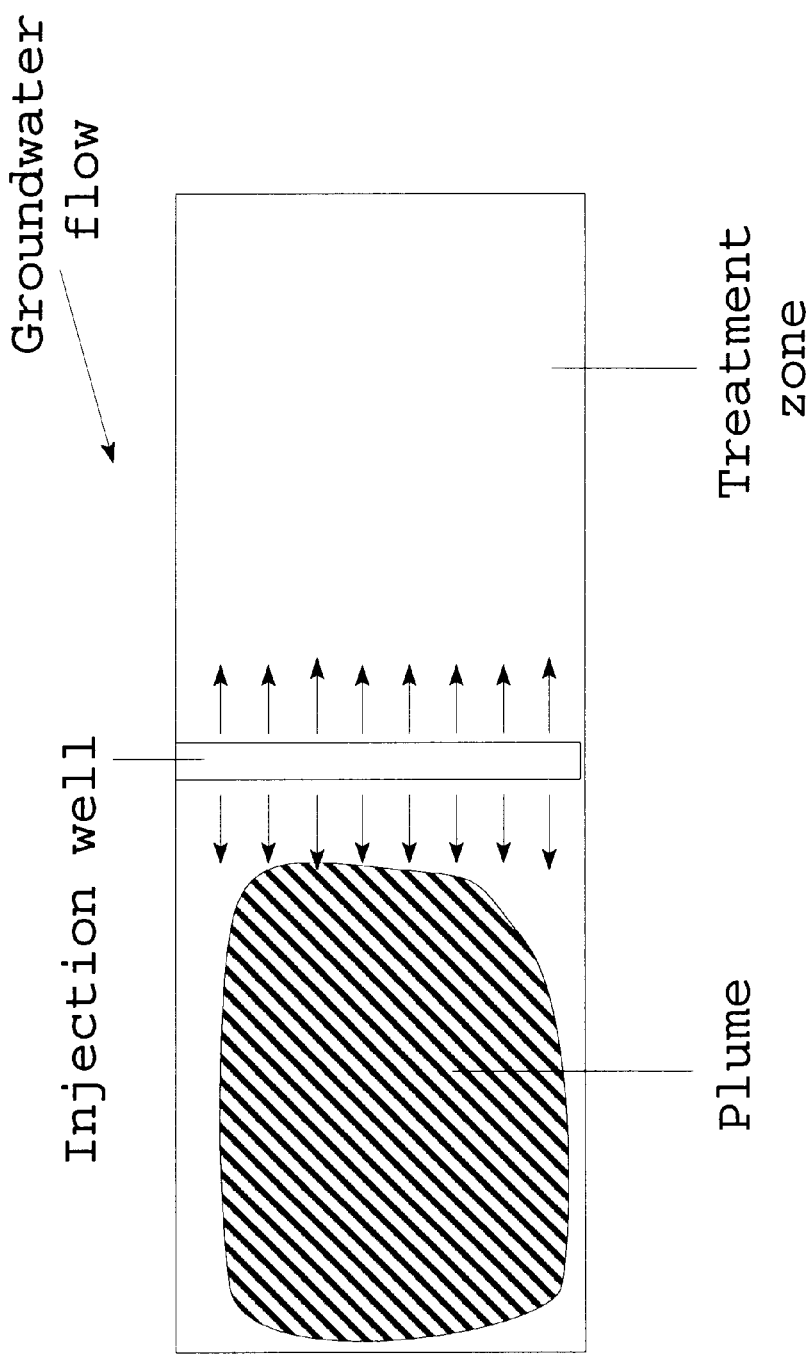
FIG. 2 depicts a schematic cross-sectional view of the treatment zone established after injection.

Before practicing the method, it is advantageous to employ known investigative methods at a site to be remediated to determine the local hydrogeology, to adequately characterize the groundwater and flow within the saturated matrix, and to establish the horizontal and vertical extent of a plume that comprises a halogenated organic compound at or above a preselected concentration. The "matrix" can comprise soil or rock. FIGS. 1 and 2 depict a plume and a treatment zone surrounding the plume. It is noted that the zone need not encompass the entire plume or can be larger than the plume.

The treatment zone can be considered to be a cylindrical slug of the aqueous solution comprising the above-noted elements. The dimensions (diameter and height) of the treatment zone will vary with the local hydrogeology and the position of the plume to be treated. The treatment zone of influence should encompass as much of the plume as is practicable. The dimensions of the treatment zone dictates the amount of the aqueous solution that is injected in the method. By way of non-limiting example, to create a zone of influence of approximately 40 feet in diameter and 8 feet in depth, an injection volume of approximately 15,000 gallons of solution is required.

Once the size of the desired treatment zone and the required injection volume are determined, one skilled in the art can determine the requirements of the injection system. The injection system can comprise a conventional well of sufficient depth to ensure that the desired treatment zone is established.

It is desirable to inject the solution as quickly and as uniformly as possible, keeping in mind the limits imposed by the hydraulic conductivity at the injection site. The time required to produce a zone of influence of desired radius and volume is readily determined from the volume and the injection rate. The solution can flow into the injection system, or, to reduce the injection time, the solution can be injected by regulated flow under a positive pressure.

The water of the aqueous solution can be deoxygenated groundwater or can be water that is physically or chemically deoxygenated, for example, by bubbling nitrogen or carbon dioxide gas, or by adding a strong reducing agent, such as, but not limited to, sulfite or citrate. Sodium sulfite at approximately 8 to 12 mg/L per mg/L dissolved oxygen is suitable. Ten mg/L of sulfite is typically sufficient for each mg/L of dissolved oxygen in the water. One of ordinary skill in the art can determine the level of dissolved oxygen using standard methods. Sodium sulfite is commercially available from VWR Scientific Products.

To establish reducing conditions in the treatment zone, the aqueous solution includes an electron donor substrate which can be added at 100–500 times the concentration of the halogenated organic compound to be degraded in the plume. It is noted that a maximum degradation rate is achieved at an electron donor concentration of 200 mg/L, even if the concentration of the halogenated source would suggest establishing a higher concentration. Because the electron donor substrate could be used as a carbon source by electron acceptors other than the target halogenated organic compound, such as aerobic microorganisms, the electron donor is added in further excess, typically 2 to 5 fold, and preferably a 2.5 fold, above and beyond the 100–500 fold excess noted above. One skilled in the art can readily determine the concentration of the halogenated organic compound at various locations in the plume.

A suitable electron donor substrate is an organic molecule that can be utilized as an energy source by the indigenous anaerobic microorganisms. The electron donor substrate should be a relatively simple organic molecule having available hydrogens that can act as the proximate electron donor during dehalogenation. Preferred electron donors include pyruvate, lactate, formate, propionate and acetate. A most preferred electron donor is lactate which is relatively inexpensive and has a high hydrogen:carbon ratio. If lactate is used as the electron donor, it can be provided in the form of sodium lactate, which can be adjusted as needed to a neutral pH. One skilled in the art can select other electron donors which can include sugars, organic acids, saccharides, polysaccharides, other long-chain branched or unbranched organic compounds, and the like.

The aqueous solution can optionally contain trace nutrients for enhancing anaerobic biodegradation. A suitable trace nutrient is yeast extract which is commercially available from, for example, Fisher Scientific. The trace nutrients can be added to a concentration of 2 mg/l in the injected solution, although the exact amount is not critical.

It is generally expected that most sites to be remediated contain indigenous anaerobic microorganisms, such as bacteria, that can reductively dehalogenate the halogenated organic compound, if reducing conditions are established. However, if anaerobic microorganisms are not indigenous to the site, suitable anaerobic microorganisms can be provided, either directly into the site or in the injected aqueous solution. For example, bacteria classified as Desulfomonile, Dehalospirilum, and Dehalobacter (in particular, *Desulfomonile tiedjei, Dehalospirilum multivorans* and *Dehalobacter restrictus*) are examples of microorganisms that can reductively dehalogenate organic compounds. If the site does not generally support growth of the microorganisms, additional nutrients can be added to support the added microorganisms.

Furthermore, enzymes isolated from microorganisms that can reductively dehalogenate halogenated compounds can also be effectively added to the site. A reductive 3-chlorobenzoate dehalogenase has been purified from *Desulfomonile tiedjei*. The enzyme is membrane bound and includes two subunits of approximately 64 and 37 kilodaltons. The enzyme probably contains a heme chromophore. This approach can be effective in areas where the groundwater does not support an indigenous anaerobic bacterial population.

It is noted that while the method effectively reduces the concentration of dissolved halogenated organic in the groundwater plume, it is not unexpected that the concentration of the organic can again increase over time as more of the compound, initially adsorbed onto native organic carbon in the matrix, dissolves into the groundwater. Thus, repeated applications of the method may be indicated.

The invention can be practiced on halogenated organic compounds in general, but finds particular utility for degrading aliphatic organic compounds, especially those having no more than five carbons. The halogenated compounds that are most abundant in the environment and which are of greatest concern are the chloroethanes and chloroethenes, notably PCE, TCE, 1,1,2,2-tetrachloroethane, 1,1,1-trichloroethane (TCA), and carbon tetrachloride (CT). The method effectively treats these compounds.

The present invention will be better understood by considering the following example which is not intended to limit the invention in any way.

EXAMPLE

Fifteen thousand gallons of an aqueous solution containing 200 mg/l lactate, 2 mg/l yeast extract, 10 mg/l sodium sulfite were pumped into an injection well upgradient of a PCE source at a rate of approximately 0.4 gallons per minute over a 22 day period. The 15,000 gallon solution was deoxygenated and had a dissolved oxygen level of less than about 1 mg/L. The groundwater from 8 monitoring wells at the site was sampled periodically and was analyzed for volatile organic compounds and indicator parameters such as dissolved oxygen, sulfate, and iron. Color and odor observations of groundwater samples one week following the end of nutrient addition indicated initial aerobic microbial growth followed by anaerobic growth. However, within two weeks, anaerobic conditions were well established in the treatment zone.

The groundwater monitoring results show that obvious and significant decreases in PCE concentrations occurred in the source area and at least 120 feet down gradient of the source area, likely as a result of the aquifer enhancement. Within a month of addition, PCE concentrations at the source decreased by nearly an order of magnitude from 100 mg/l to 15 mg/l. Twenty feet down gradient of the injection well, the PCE concentration decreased from about 500 mg/l to 240 mg/l within 100 days, although it later increased to near original levels. A slight rise in the trichloroethene (TCE) concentration was evident. TCE is a product of reductive dechlorination of PCE. The occurrence of TCE in the source area is evidence of microbial degradation, because the released solvent did not contain significant TCE concentrations and TCE was not detected in the source area prior to injection. One hundred twenty feet downgradient of the injection site, the PCE concentration decreased from about 1500 mg/l to 280 mg/l within 176 days.

Because the PCE concentrations reequilibrated to near original levels, additional injections may be necessary.

The present invention is not intended to be limited to the foregoing, but rather to encompass all such modifications and variations as come within the scope of the accompanying claims.

We claim:

1. A method for dehalogenating an halogenated organic compound in groundwater, the method comprising the step of:

injecting into a saturated matrix within or upgradient of a source of the organic compound a deoxygenated aqueous solution that consists essentially of an electron donor, the deoxygenated solution being injected in an amount sufficient to establish an anaerobic treatment zone that comprises an anaerobic microorganism that reductively dehalogenates the organic compound when an electron donor is available, the injected electron donor being available in an amount sufficient to permit the anaerobic microorganism to reductively dehalogenate the organic compound in the treatment zone, the deoxygenated solution comprising a sufficiently low amount of dissolved oxygen that indigenous aerobic microorganisms are substantially unable to reproduce in the treatment zone, thereby preventing the aerobic microorganisms from competing with the anaerobic microorganism for the electron donor, so that the anaerobic microorganism reductively dehalogenates the organic compound substantially without competition from the indigenous aerobic microorganisms.

2. A method as claimed in claim 1 wherein the solution further comprises nutrients required for growth of the anaerobic microorganism.

3. A method as claimed in claim 1 wherein the solution further comprises a deoxygenating agent.

4. A method as claimed in claim 3 wherein the deoxygenating agent is selected from a group consisting of sulfite, citrate and a strong reducing agent.

5. A method as claimed in claim 1 wherein the solution further comprises an anaerobic microorganism that reductively dehalogenates the organic compound when an electron donor is available.

6. A method as claimed in claim 1 wherein the electron donor is selected from a group consisting of lactate, acetate, and propionate.

7. A method as claimed in claim 1 wherein the halogenated organic compound comprises an aliphatic chain of no more than six carbons.

8. A method as claimed in claim 1 wherein the halogenated organic compound consists essentially of carbon and halogen atoms.

9. A method as claimed in claim 1 wherein the halogenated aliphatic organic compound is selected from a group consisting of perchloroethene, trichloroethene, 1,1,2,2-tetrachloroethane, 1,1,1-trichloroethane, and carbon tetrachloride.

10. A method as claimed in claim 8 wherein the halogenated organic compound is perchloroethene.

* * * * *